United States Patent [19]
Kavanaugh

[11] Patent Number: 4,754,178
[45] Date of Patent: Jun. 28, 1988

[54] STEPPER MOTOR

[75] Inventor: Richard J. Kavanaugh, Farmington, Conn.

[73] Assignee: MCS, Inc., Farmington, Conn.

[21] Appl. No.: 85,217

[22] Filed: Aug. 12, 1987

Related U.S. Application Data

[63] Continuation of Ser. No. 857,198, Apr. 29, 1986, abandoned.

[51] Int. Cl.$^4$ .............................................. H02K 37/00
[52] U.S. Cl. .................................. 310/49 R; 310/217; 310/254
[58] Field of Search ....................... 310/42, 49, 89, 90, 310/254–260, 67, 216–218

[56] References Cited

U.S. PATENT DOCUMENTS

| | | | |
|---|---|---|---|
| 1,882,487 | 10/1932 | DuPont | 310/217 X |
| 2,792,512 | 5/1957 | Koch | 310/258 |
| 2,982,872 | 5/1961 | Fredrickson . | |
| 3,206,623 | 9/1965 | Snowdon | 310/49 |
| 3,310,698 | 3/1967 | Krell | 310/258 |
| 3,343,014 | 9/1967 | Giles | 310/49 |
| 3,506,859 | 4/1970 | Snowdon . | |
| 3,858,067 | 12/1974 | Otto | 310/258 X |
| 4,071,794 | 1/1978 | Schoen | 310/257 X |
| 4,234,808 | 11/1980 | Geppert | 310/258 X |
| 4,347,457 | 8/1982 | Sakamoto . | |
| 4,363,987 | 12/1982 | Vorotyntseva et al. | 310/254 X |
| 4,417,167 | 11/1983 | Ishii et al. | 310/67 |

Primary Examiner—Donovan F. Duggan
Attorney, Agent, or Firm—Lee C. Robinson, Jr.

[57] ABSTRACT

A two phase stepper motor having a rotor shaft with a multi-pole rotor and a stator assembly in magnetic flux relationship with the rotor. The stator assembly includes a plurality of sequentially stacked laminations which are each provided with eight stator poles with each immediately successive stator pole having an opposite phase and each being at a 45° index spacing from the immediately adjacent lamination. The stepper motor also contains a multi-phase winding for energizing the stator poles to operate the rotor in successive discrete steps. The stepper motor housing includes first and second end pieces having a pair of triangular cross-section members forming notches therebetween on a first pair of oppositely disposed corners which receive and retain an abutment post on a second pair of oppositely disposed corners from the opposite end piece thereby interlocking the first and second end pieces relative to one another.

13 Claims, 4 Drawing Sheets

STEPPER MOTOR

This application is a continuation of application Ser. No. 857,198, filed Apr. 29, 1986, now abandoned.

BACKGROUND OF THE INVENTION

This invention relates to electric rotating machines and more particularly to such machines in which the rotor of the machine runs in discrete increments or steps.

The present invention, while of general application, is particularly well suited for use as a stepper motor. Stepper motors are precision devices but heretofore have been susceptible to step angle performance inaccuracies due to the variations in the physical and magnetic charcteristics of the stator and the rotor. In a typical stepper motor (e.g. 1.8 mechanical degrees per step), it is advantageous to maintain the step angle accuracy to a better than ±3% total error per step (i.e. ±0.054° or 0°-3'-15"). The processes required to produce the parts to the required tolerances are extremely difficult to achieve. As an example, a 1.8° motor that requires fifty stator teeth with an internal diameter of 0.860" has a tooth width requirement of 0.020" and a true angular position requirement of 7.2°. To achieve the step angle accuracy, the parts must be produced to tolerances of 0.020±0.00006" for the tooth width and angle tolerances of 7.2°±0°-12'-58". The air gap between the rotor and the stator must also have very accurate diametrical and circular dimensions.

Several types of prior stepper motors have two or more stator windings which are energized in different phase relationship with each other. Without perfect symmetry between the phases of the windings, the rotor will step with different step angles, i.e. "long-step", "short-step", and these angles will vary with the direction of rotation of the rotor.

Another problem with stepper motors of the type previously employed is excessive eddy current losses. The net effect of eddy current losses in a stepper motor is the creation of different inductance components which have a deleterious effect on the step angle accuracy and torque depending upon which phase is energized.

Many prior stepper motors had an additional problem in that the top and bottom housings of the motor were difficult to align by means of mounting screws needed to attach the two housings together. Additionally, it was important not to locate the mounting screws in a position which would create a magnetic imbalance.

The present invention is directed toward solving these problems and provides a workable and economical solution to them.

OBJECTS OF THE INVENTION

It is therefore a general object of the present invention to provide an improved stepped motor.

It is also an object of the present invention to provide a stepper motor which has good magnetic symmetry between the phases of the windings.

It is a further object of the present invention to improve step angle accuracy, step rate and torque output, and at the same time, minimize eddy current losses.

It is still a further object of the present invention to provide a stepper motor with interlocking top and bottom housings which require no mounting screws for their attachment.

SUMMARY

In an illustrative embodiment of the invention, there is provided a two phase motor with a 90 degree phase shift between the two energizing windings of the motor. The invention utilizes a salient pole rotor which can be run at synchronous speed.

The stator assembly of the motor comprises a plurality of sequentially stacked laminations. The stacked laminations form an eight-sided structure with eight stator poles arranged such that each immediately successive stator pole has an opposite phase. Five stator teeth project from each stator pole. Electrical lead wires are wound around the arms of the stator poles with four stator poles being wound of one phase and the four other stator poles being wound of an opposite phase.

Each successive lamination is at a 45 degree index spacing from the immediately adjacent lamination. Since the motor utilizes an eight-sided stator, which permits indexing of the laminations every 45 degrees, improved accuracy results as the rotor will "interpret" the stator as being magnetically perfect.

The rotor of the motor includes a permanent magnet with one side magnetized as a N-pole and the other side magnetized as a S-pole. The rotor assembly also includes a pair of rotor pole pieces made of magnetic circular plate. The permanent magnet is aligned between the rotor pole pieces. The rotor pole pieces include a plurality of rotor teeth which are aligned with the stator teeth at 0°, 90°, 180°, and 270°, and are one-quarter pole pitch away from the stator teeth at 45°, 135°, 225°, and 315° which aids in start-up efficiency.

The stepper motor also includes a unique fastening arrangement which alleviates the necessity for mounting bolts or screws. First and second end pieces each of substantially square cross-section have a pair of a generally triangular cross-section members on opposite corners thereof. The pair of triangular cross-section members form a notch therebetween, and abutment posts are situated on the remaining opposite corners of the end pieces. The abutment posts of the first end piece are reliably retained within the notches between the triangular cross-section members of the second end piece, and the abutment posts of the second end piece are retained within the notches between the triangular cross-section members of the first end piece to frictionally interlock the stepper motor assembly.

The foregoing and other objects and advantages of the invention will become more fully apparent from the following detailed description and from the appended drawings in which like numbers have been used to describe like parts of the several views.

DESCRIPTION OF A PREFERRED EMBODIMENT

Figure 1:
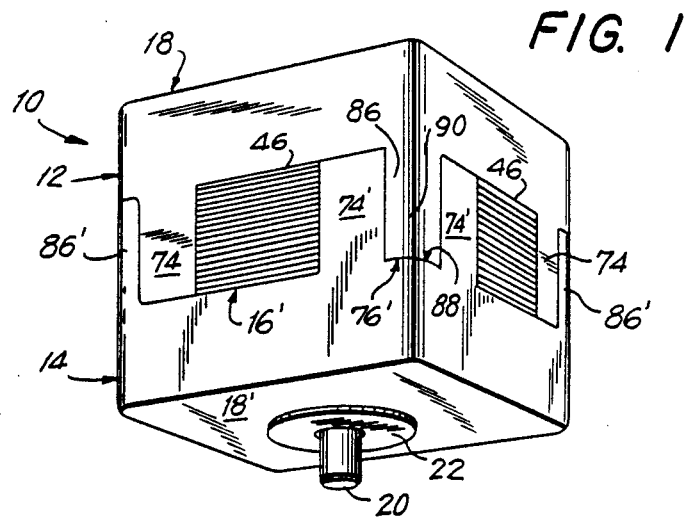
FIG. 1 is a front perspective view of a stepper motor in accordance with an illustrative embodiment of the invention.

Referring to FIG. 1, a stepper motor 10 has a housing formed of a first end piece 12 and a second end piece 14. The end pieces 12 and 14 are also referred to in the art as end bells. End pieces 12 and 14 respectively comprise an inner base 16 and a lower base 18 which are composed of a magnetic, non-magnetic or plastic material and are of a generally square cross-section. The inner and outer bases 16 and 18 may also be referred to as the inner and outer portions 16 and 18, respectively. A rotor shaft 20 is centrally mounted within stepper motor 10 and extends outwardly from second end piece 14. A washer 22 is placed within a washer recess 24 extending inwardly from outer base 18 of one of the end pieces and provides a retention mechanism for retaining the free end 21 of rotor shaft 20 in its centralized position within stepper motor 10. The structure of the first and second end pieces 12 and 14 is identical. As a result, the drawings illustrate the corresponding character references of the second end piece 14 with a "'" symbol. However, the character references, such as 18 and 18' will be collectively referred to as 18, unless otherwise disclosed herein.

Figure 4:
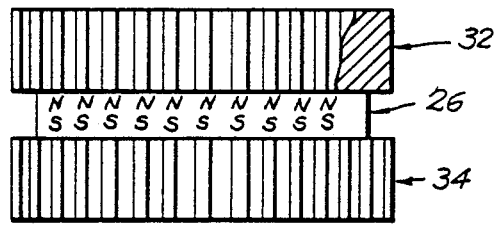
FIG. 4 is an enlarged side elevational view of the arrangement of the rotor assembly of the stepper motor.
Figure 2:
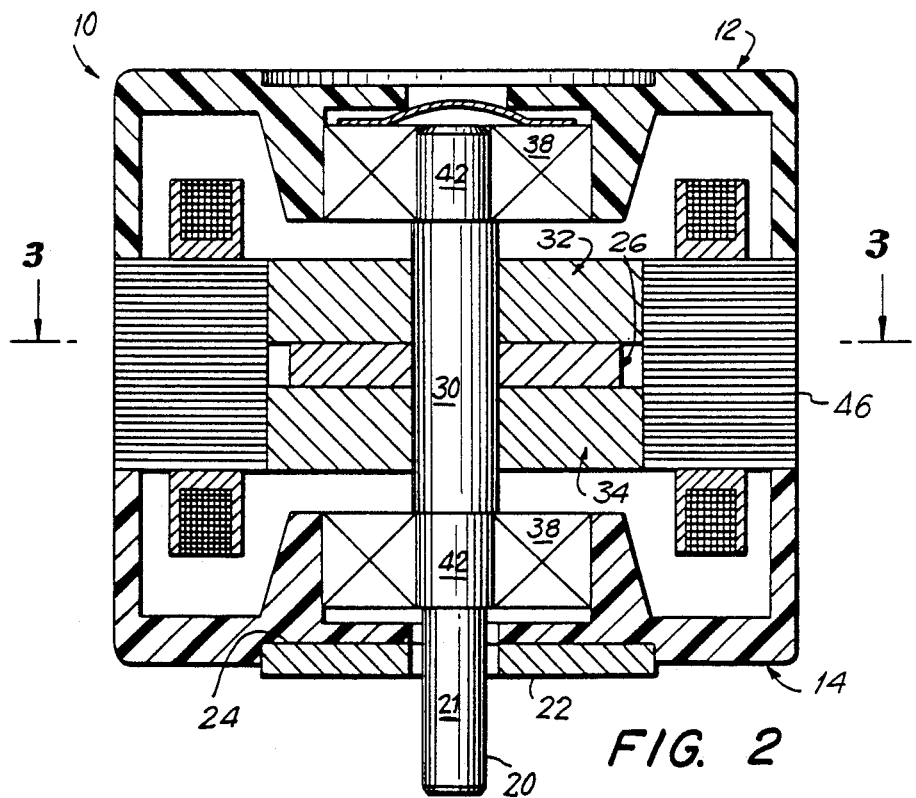
FIG. 2 is a sectional view of the stepper motor taken along line 2—2 in FIG. 3.
Figure 6:
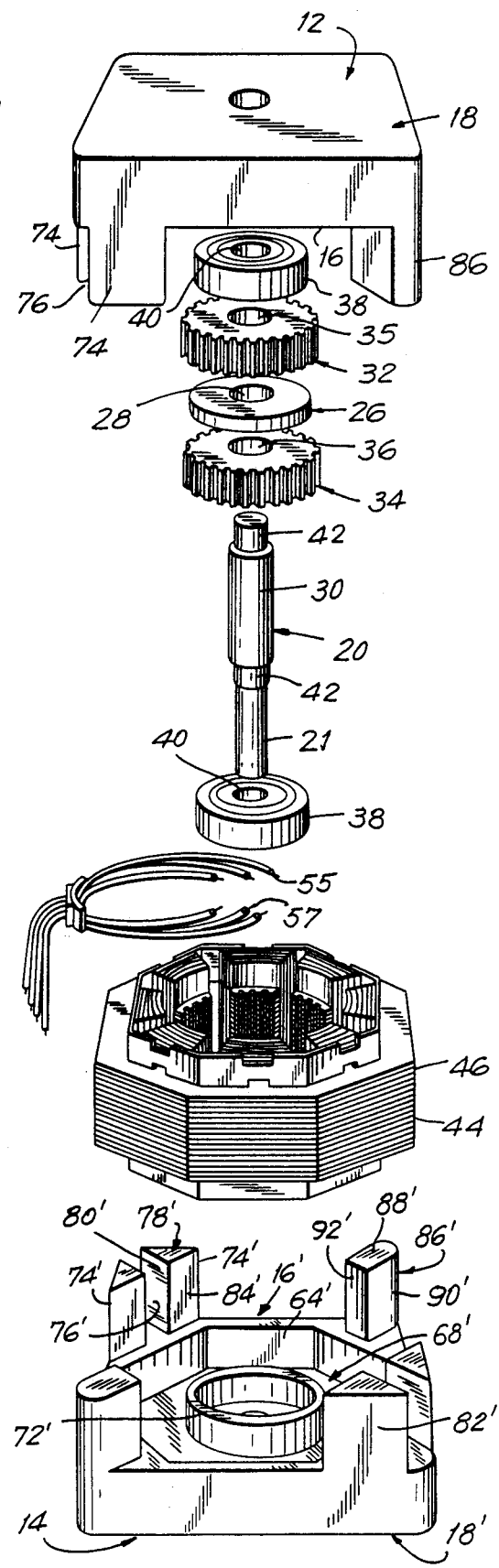
FIG. 6 is an exploded perspective view of the stepper motor.

As shown in FIGS. 2, 4, and 6, the rotor assembly of stepper motor 10 includes a permanent magnet 26 made of a ferrite-like material, preferably samarium cobalt, which has the shape of a cylindrical disk and is magnetized with two poles, one being magnetized as a positive N-pole and the other side being magnetized as a negative S-pole. Permanent magnet 26 includes an aperture 28 centrally formed therein which receives rotor shaft 20 and is rotatably engagable with the center cylindrical section 30 of rotor shaft 20.

As best shown in FIGS. 2 and 4, the present invention also includes a pair of rotor pole pieces 32 and 34 which are formed of a magnetic circular plate. Permanent magnet 26 is aligned between rotor pole pieces 32 and 34. Therefore, the rotor pole piece 32 adjacent the positive N-pole of permanent magnet 26 will be magnetized as a positive N-pole and the rotor pole piece 34 adjacent the negative S-pole will be magnetized as a negative S-pole. The rotor assembly generally consists of rotor shaft 20, permanent magnet 26 and rotor pole pieces 32 and 34. The central openings 35 and 36 of rotor pole pieces 32 and 34, respectively, rotatably engage central cylindrical portion 30 of rotor shaft 20 permitting permanent magnet 26 and pole pieces 32 and 34 to rotate about rotor shaft 20 as a single unit.

A pair of bearings 38 also retain rotor shaft 20 within stepper motor 10. The bearing aperture 40 retains rotor shaft 20 along the bearing cylindrical section 42 of rotor shaft 20.

Figure 5:
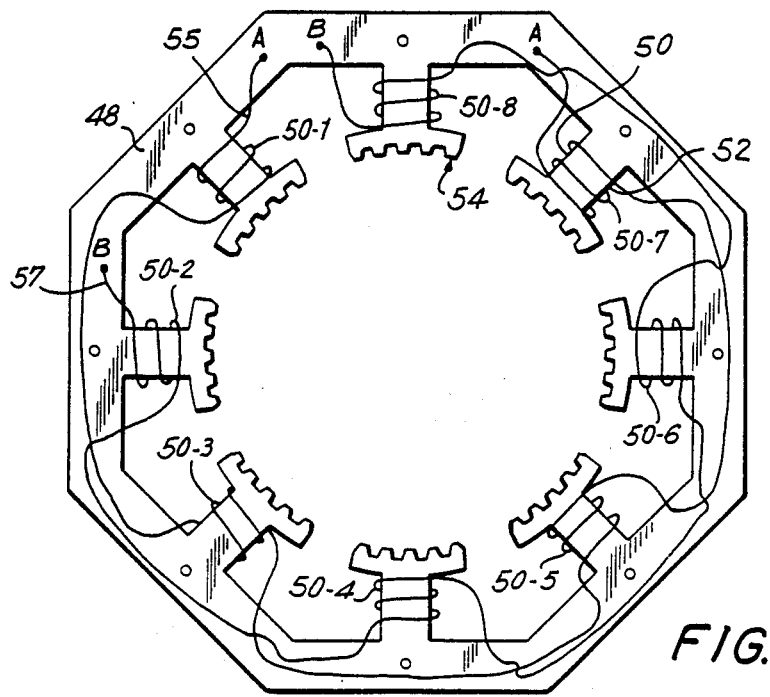
FIG. 5 is a top elevational view of one of the laminations of the stator assembly.
Figure 3:
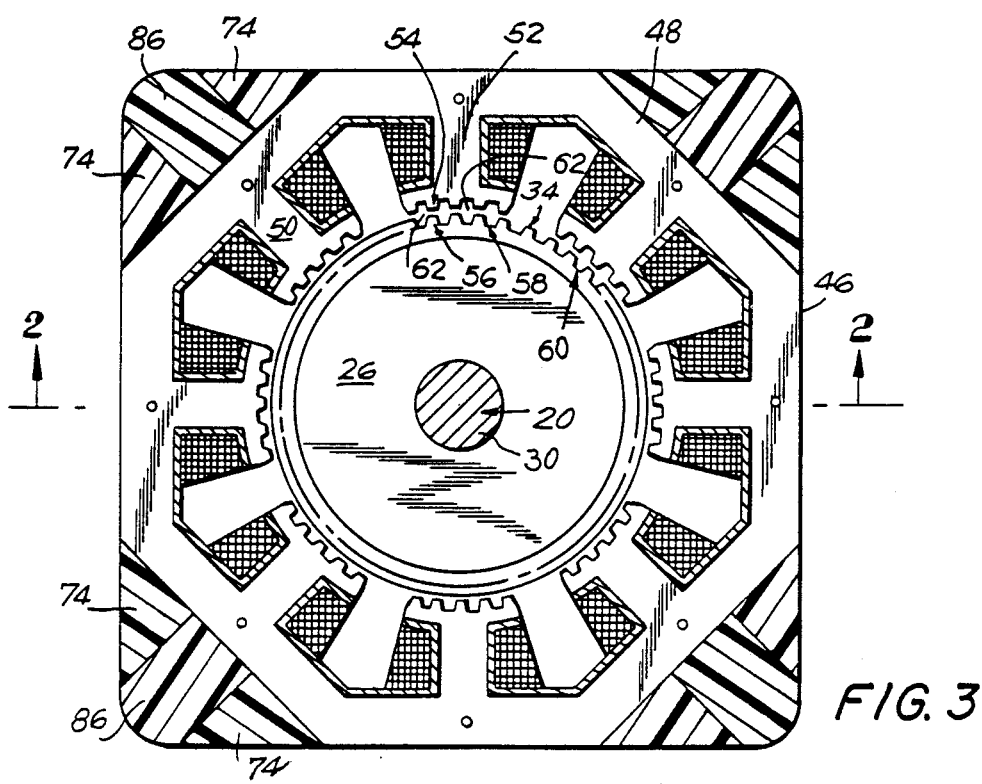
FIG. 3 is a sectional view of the stepper motor taken along line 3—3 of FIG. 2.

A stator assembly 44 in magnetic flux relationship with the rotor assembly includes a plurality of sequentially stacked laminations 46 each being octagonally-shaped. As illustrated in FIG. 5, each individual lamination 46 has an outer web member 48 which is interconnected to the stator poles 50 by means of arms 52. As shown in FIGS. 3 and 5, preferably five stator teeth 54 are included on each stator pole 50. The arms 52, and therefore poles 50, of the laminations 46 have electrical windings wound therearound which are in electrical communication with a two-phase A.C. generator which generates electrical pulses in discrete increments. Poles 50-1, 50-3, 50-5, and 50-7 are wound with one distinct phase of wires 55 and poles 50-2, 50-4, 50-6, and 50-8 are wound of the other phase of wires 57. Therefore, when a phase is energized by discrete pulses four poles are magnetized with one polarity and four poles are magnetized with the other polarity.

As illustrated in FIG. 3, rotor pole pieces 32 and 34 also include a plurality of rotor teeth 56 which are aligned with stator teeth 48 at 0°, 90°, 180°, and 270° as at position 58. At 45°, 135°, 225°, and 315°, rotor teeth 56 are one-quarter pole pitch away from stator teeth 48 as at position 60. This arrangement serves to shift the direction of the stator flux passing through the rotor-stator air gap 62 from the oppositely polarized stator teeth to the rotor teeth at 45°, 135°, 225°, and 315° at those positions as the flux builds up during starting. Accordingly, this shift in direction due to the delayed start up of stator flux of the stator poles will impart a unidirectional starting characteristic to the motor in a manner well understood by those conversant with the art. Furthermore, upon deenergization of the motor, this one-quarter pole pitch offset at 45°, 135°, 225° and 315° will assist in bringing the motor to a rapid stop. In addition, this one-quarter pole pitch offset creates start up potential as the magnetic flux is still developed at 45°, 135°, 225° and 315°.

Figure 7:
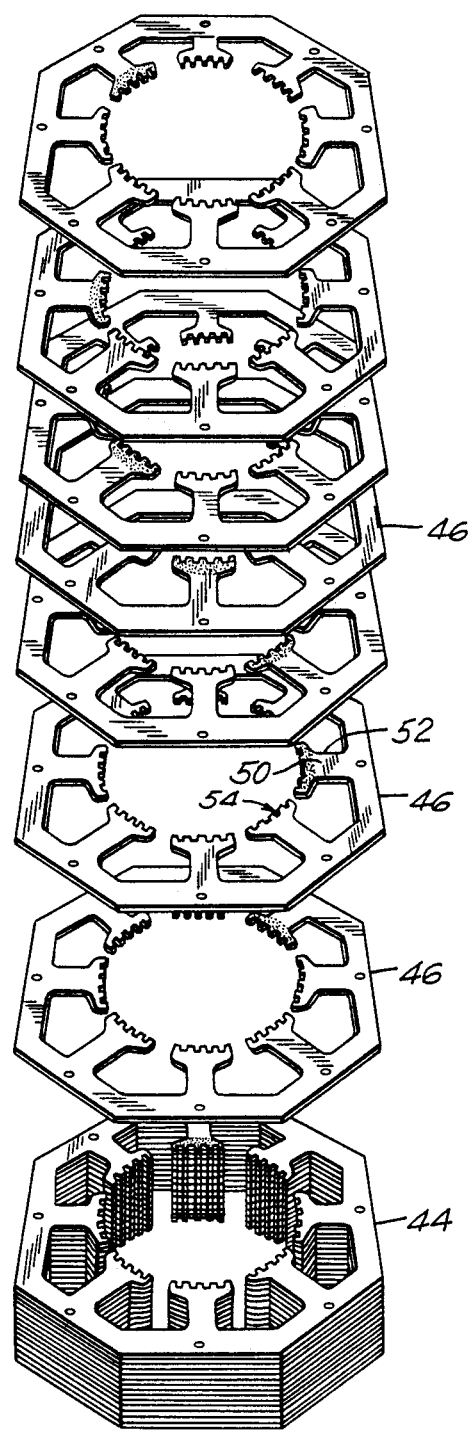
FIG. 7 is an exploded perspective view of the sequentially stacked laminations within the stator assembly illustrating the 45 degree index spacing of each successive lamination.

As shown in FIG. 7, the laminations 46 are indexed at a mechanical 45° spacing from each immediately successive adjacent lamination. By indexing the laminations every major stator pole, this "averages" the tooth width, angular spacing and the air gaps between the rotor and the stator so that the interactive rotor "interprets" the stator as being magnetically perfect. The ability to index each successive lamination 46 by a 45° spacing also provides for greater accuracy than that achieved by a 90° index spacing of the prior art square stators. As a direct result, the precise tolerances required of the air gaps and circularity are achieved.

To minimize eddy current losses, the stator laminations 46 are made from a thin electrical grade magnetic steel. This type of material has a grain orientation that will yield different electrical properties when an electromagnetic flux is working with or against the grain. The net effect in a stepper motor is the creation of different inductance components which have a deleterious effect on the step angle accuracy and torque depending upon which phase is energized. However, indexing the laminations 46 by 45° compensates for these differences thereby improving the step angle accuracy, step rate and torque output.

In addition, by indexing each successive lamination 46 by 45°, the stator is "interpreted" as being magnetically symmetrical by the rotor. Without the perfect symmetry, the rotor would step with a different step angle (i.e., "long-step", "short-step", etc.) and would vary with the direction of rotation of the motor. Such magnetic symmetry of the stator permits the stepper motor to be more fully utilized in precision devices such as rotating memory systems (disc drives).

Another advantage to the present invention utilizing an octagonal-shaped stator is the reduction of air gaps between the stator and rotor. A four-pole motor is very inefficient because of large gaps between the rotor and the stator. The air gaps 62 between the stator and the rotor of the present invention are minimal in comparison to the air gaps of a four pole motor. Therefore, the electrical flux between the rotor and the stator in the present invention is significantly increased as a result of utilizing an eight pole motor.

As shown in FIG. 6, the first end piece 12 and the second end piece 14 are identical. The first and second end bells 12 and 14 define a pair of oppositely disposed housing members for supporting the stator assembly 44. The first and second end pieces include an inner base 16 and a outer base 18. The inner base or portion 16 aids in supporting the stator assembly 44 when the end pieces 12 and 14 are matingly engaged as shown in FIG. 1. The end pieces 12 and 14 include inner side edges 64 depending from the inner base 16 which is generally octagonally-shaped. The bottom edge 66 of the inner side edges 64 defines a stator recess 68. The sides of the octagon-shaped stator assembly 44 are retained within the stator recesses 68 of the first and second end pieces 12 and 14 abutting the inner side edges 64 to thereby retain and support the stator assembly 44 within the stepper motor assembly 10.

The first and second end bells 12 and 14, respectively, also include a cylindrical flange or bearing flange 72 extending from the stator recess 68 and centrally located within the end pieces 12 and 14. The cylindrical or bearing flange 72 provides a means for retaining and receiving the bearings 38 within the stepper motor assembly 10.

A pair of triangular cross-section members 74 extending inwardly from the inner base 16 of the end pieces 12 and 14 are located at a first pair of opposite corners of the end pieces 12 and 14. The pairs of triangular cross-section members 74 form notches 76 therebetween. The triangular cross-section members 74 include a top face 78, an inner face 80, a front face 82 and a side face 84. The inner faces 80 of the pair of triangular cross-section members 74 on each corner are generally parallel to one another and define the space forming the notches 76.

On the second pair of corners of the end pieces 12 and 14 not occupied by the pair of triangular cross-section members 74, abutment posts 86 of generally semi-circular cross-section extend from the inner base 16. The abutment posts 86 include a top edge 88, a side surface 90 and a rear edge 92. The triangular cross-section members 74 and the abutment posts 86 are of identical height. The abutment posts 86 of the first end piece 12 are inserted within the notches 76 between the triangular cross-section members 74 of the second end piece 14. The abutment posts 86 of the second end piece 14 are inserted within the notches 76 between the triangular cross-section members 74 of the first end piece 12. In this closed position, the top edge 88 of the abutment posts 86 abut the bottom surface 77 of the notches 76. The side surface 90 of the posts 86 are also tightly retained by the parallel inner faces 80 of the triangular cross-section members 74. In addition, the side face 84 of the triangular cross-section members 74 and the rear edge 92 of the posts 86 are angularly displaced within the end bells 12 and 14 so that the stator assembly 44 fits tightly therebetween.

As a result of this configuration of the first and second end bells, the entire stepper motor assembly is frictionally interlocked. Such a frictional locking means obviates the necessity of mounting screws to secure the first end piece relative to the second end piece and minimizes magnetic imbalance caused by utilziing mounting screws. The first and second end pieces 12 and 14 may also be adjoined by any commercially available adhesive means.

In use, by means of a two phase A.C. generator which generates electric pulses in discrete increments, poles 50-1, 50-3, 50-5 and 50-7 will be magnetically polarized of a different phase than poles 50-2, 50-4, 50-6, and 50-8. As the phases of the stator poles are continually reversed, the poles of the rotor will continually rotate about the stator at discrete increments based upon the pulses of the generator.

Since the successive laminations 46 of the stator assembly 44 are indexed 45 degrees, the tooth width, angular spacing and air gap between the rotor and the stator are "averaged" and as such the rotor "interprets" the stator assembly 44 as being magnetically perfect. Therefore, greater accuracy in terms of step angle accuracy, step rate and torque output result when the stepper motor is in operation.

As a result of the rotor teeth 56 being aligned with the stator teeth 48 at 0°, 90°, 180°, and 270° and being one-quarter pole pitch away at 45°, 135°, 225° and 315°, a shift in direction due to the delayed start up of the stator flux of the stator poles will impart a unidirectional starting characteristic to the motor. This configuration also assists in bringing the motor to a rapid stop upon deenergization, however, due to magnetic flux still being developed at 45°, 135°, 225° and 315°, the present invention also has increased start up potential.

The stator assembly 44 is placed and supported within the stator recesses 68 of the first and second end bells 12 and 14. The stator assembly 44 is firmly retained within the stepper motor 10 by the opening defined by the stator recesses 68 and the inner side edges 64 of the front and rear end bells 12 and 14.

The first and second end pieces 12 and 14, respectively, are frictionally interlocked by each abutment post 86 of the first end piece 12 being reliably retained within the notches 76 between the triangular cross-section members 74 of the second end piece 14 and each abutment post 86 of the second end piece 14 being reliably retained within the notches 76 between the triangular cross-section members 74 of the first end piece 12. In this manner, the first and second end pieces 12 and 14, respectively, are frictionally engaged and the entire stepper motor assembly may be frictionally interlocked without mounting screws.

The terms and expressions which have been employed are used as terms of description and not of limitation and there is no intention in the use of such terms and expressions of excluding any equivalents of the features described or portions shown thereof, it being recognized that various modifications are possible within the scope of the invention.

What is claimed is:

1. A stepper motor comprising:
   a rotor shaft;
   a rotor mounted on the rotor shaft and having a plurality of rotor poles;
   a stator assembly in magnetic flux relationship with the rotor and including a plurality of sequentially stacked laminations, each said lamination having eight stator poles and being offset at a 45 mechanical degree index spacing from an immediately adjacent lamination with each stator pole of a lamination being juxtaposed in relation to a stator pole of an immediately adjacent lamination;
   means for energizing the stator poles to operate the rotor in successive discrete steps;
   identical and interchangeable first and second end pieces for supporting the stator assembly, each said first and second end piece including a recessed octagonally shaped section which receives and retains the stator assembly within the stepper motor assembly, said first and second end pieces each having first and second pairs of oppositely disposed corners, the first and second end pieces further including:

an inner portion supporting the stator assembly;

a pair of triangular cross-section members extending from said inner portion and respectively situated on a first pair of oppositely disposed corners of each of said end pieces, each pair of triangular cross-section members forming a notch therebetween; and an abutment post extending from said end piece and respectively situated on a second pair of oppositely disposed corners of each said end piece;

each said abutment post of said first end piece being reliably retained within each said notch of said second end piece and each said abutment post of said second end piece being reliably retained within each said notch of said first end piece to frictionally interlock the first and second end pieces.

2. The stepper motor of claim 1 and further including:

a pair of rotor pole pieces made of a magnetic circular plate; and a permanent magnet aligned between said rotor pole pieces and having one side magnetized as an N-pole and the other side magnetized as an S-pole.

3. The stepper motor of claim 2 wherein said permanent magnet and said pole pieces have apertures formed therein for unitary rotational engagement with said rotor shaft.

4. The stepper motor of claim 2 wherein each said rotor pole piece has a plurality of rotor teeth aligned with said stator teeth at 0°, 90°, 180°, and 270° and one-quarter pole pitch away from said stator teeth at 45°, 135°, 225° and 315°.

5. The stepper motor of claim 1 wherein each said stator pole has an odd number of stator teeth projecting therefrom.

6. The stepper motor of claim 1 and further including a pair of bearings reliably retaining said rotor shaft within the stepper motor.

7. The stepper motor of claim 6 wherein said end pieces include a bearing flange which receives and retains said bearings.

8. The stepper motor of claim 1 and further including, a washer having an aperture formed therein for receiving said rotor shaft; and said second end piece further including a washer recess to receive and retain said washer within the stepper motor assembly.

9. The stepper motor of claim 1 which further comprises adhesive means for joining said end pieces.

10. A stepper motor comprising:

a rotor assembly including a rotor shaft, a pair of rotor pole pieces, and a permanent magnet positioned between said rotor pole pieces;

a stator assembly including a plurality of sequentially stacked lamination in magnetic flux relationship with the rotor assembly, each said lamination having eight stator poles and being offset at a 45 mechanical degree index spacing from an immediately adjacent lamination with each stator pole of a lamination being juxtaposed in relation to a stator pole of an immediately adjacent lamination; and housing means for supporting the stator assembly and including a pair of identical and interchangeable end pieces, each of the end pieces having an outer and an inner portion and first and second pairs of oppositely disposed corners, each end piece including two pairs of triangular cross section members extending inwardly from the inner portion of each end piece and respectively situated at the first pair of opposite corners, each pair of triangular cross-section members forming a notch therebetween, each said end piece having a pair of abutment posts extending inwardly from the inner portion of each end piece and respectively situated at the second pair of oppositely disposed corners, said pair of abutment posts of one end piece being respectively retained within the notches of said other end piece to frictionally interlock said end pieces.

11. The stepper motor of claim 10 wherein said housing means further includes:

a bearing holder;

a pair of bearings received and retained by the bearing holder, the pair of bearing reliably retaining the rotor shaft within the housing.

12. The stepper motor of claim 10 wherein said first and second end pieces further include inner side edges depending from said inner portion retaining and supporting the stator assembly within the stepper motor.

13. The stepper motor housing of claim 10 and further including:

a washer having an aperture therein which receives and retains said rotor shaft; and said second end piece further includes a washer recess which receives and retains said washer.

* * * * *